Aug. 1, 1950 A. SACHS 2,517,447
METAL BAR SHEARS

Filed Feb. 6, 1948 3 Sheets-Sheet 1

Aaron Sachs
INVENTOR.
BY Chas. Denegre
Attorney.

Aug. 1, 1950 — A. SACHS — 2,517,447
METAL BAR SHEARS

Filed Feb. 6, 1948 — 3 Sheets-Sheet 2

Aaron Sachs
INVENTOR.
BY Chas. Denegre
Attorney.

Aug. 1, 1950     A. SACHS     2,517,447
METAL BAR SHEARS

Filed Feb. 6, 1948     3 Sheets-Sheet 3

INVENTOR
Aaron Sachs
By Chas. Denegre
Attorney

Patented Aug. 1, 1950

2,517,447

UNITED STATES PATENT OFFICE 2,517,447

METAL BAR SHEARS

Aaron Sachs, Bessemer, Ala.

Application February 6, 1948, Serial No. 6,783

2 Claims. (Cl. 164—41)

This invention relates to metal bar shears. It has for its main objects to provide power operated shears that will be highly efficient for the purpose intended, comparatively cheap to manufacture, simple in structure, and extremely durable. A further object is to provide such a device that will be compact, and portable for easy moving to different departments of a plant in which it is used. Generally such shears now in use are very large and cumbersome and placed in fixed positions.

Other objects and advantages will appear from the drawings and description.

Figure 1:
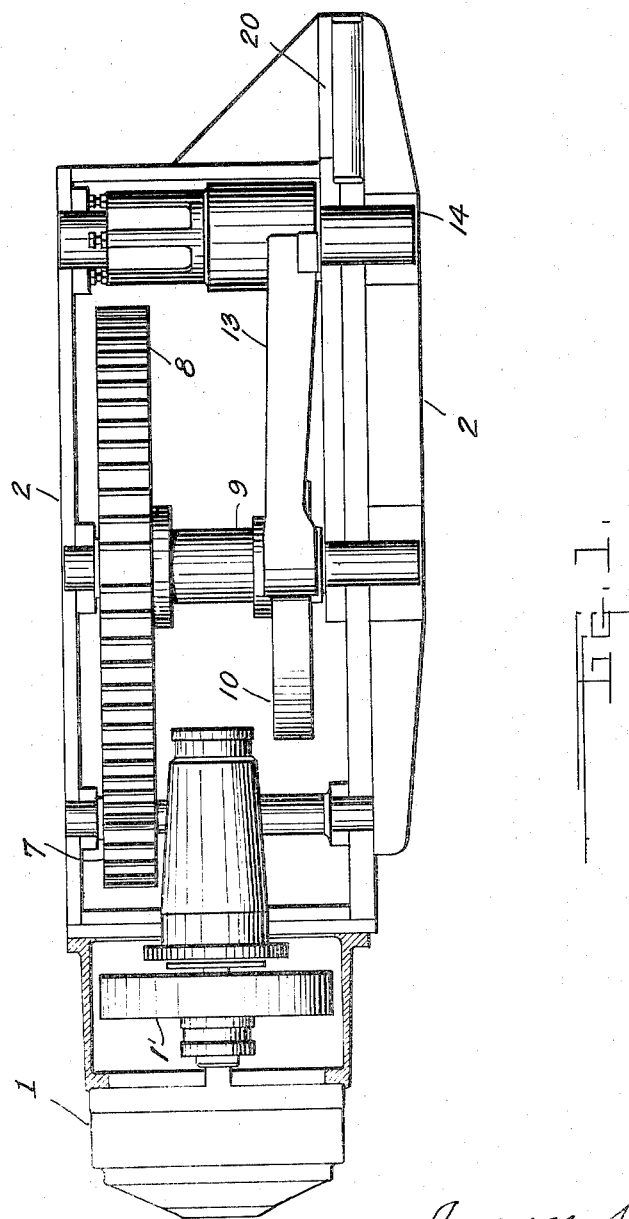
Figure 2:
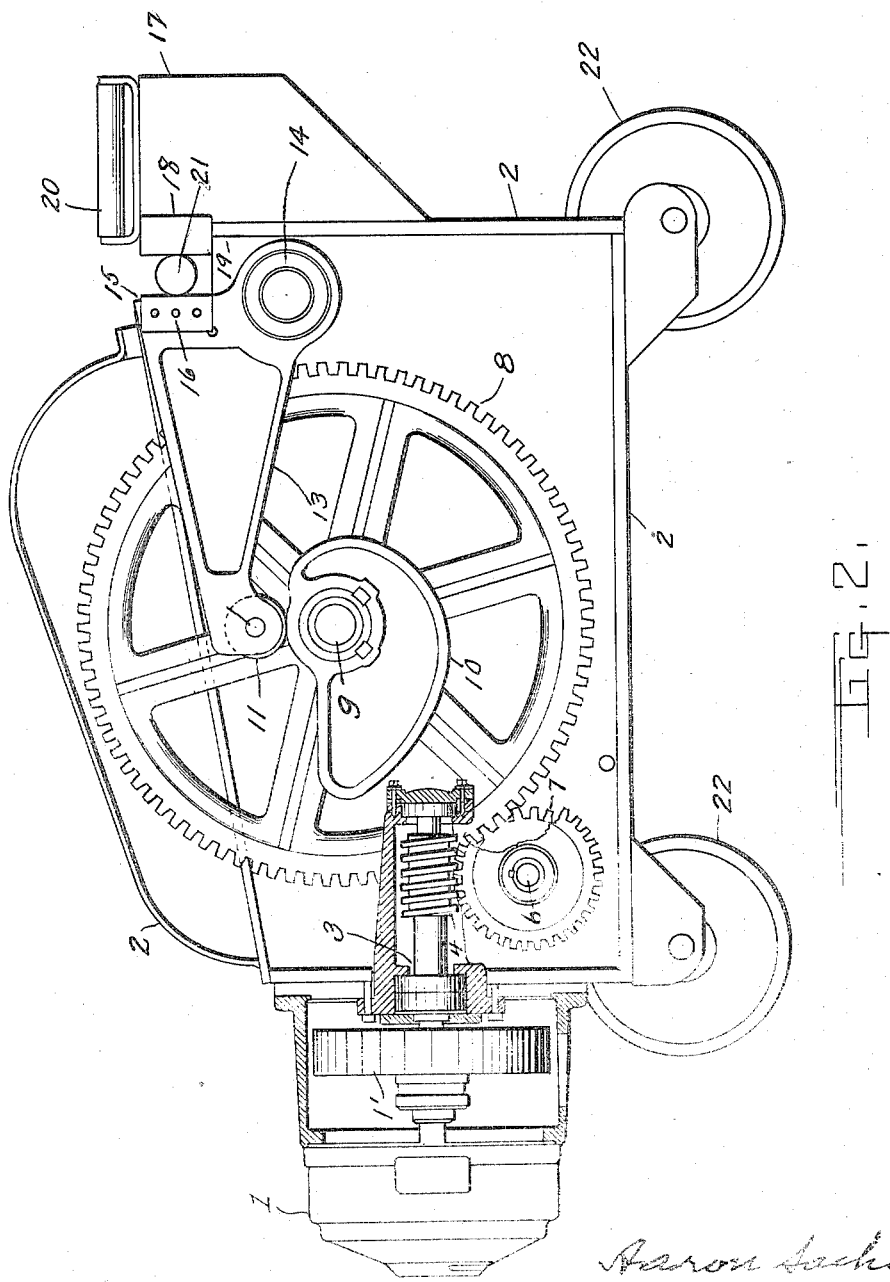
Figure 3:
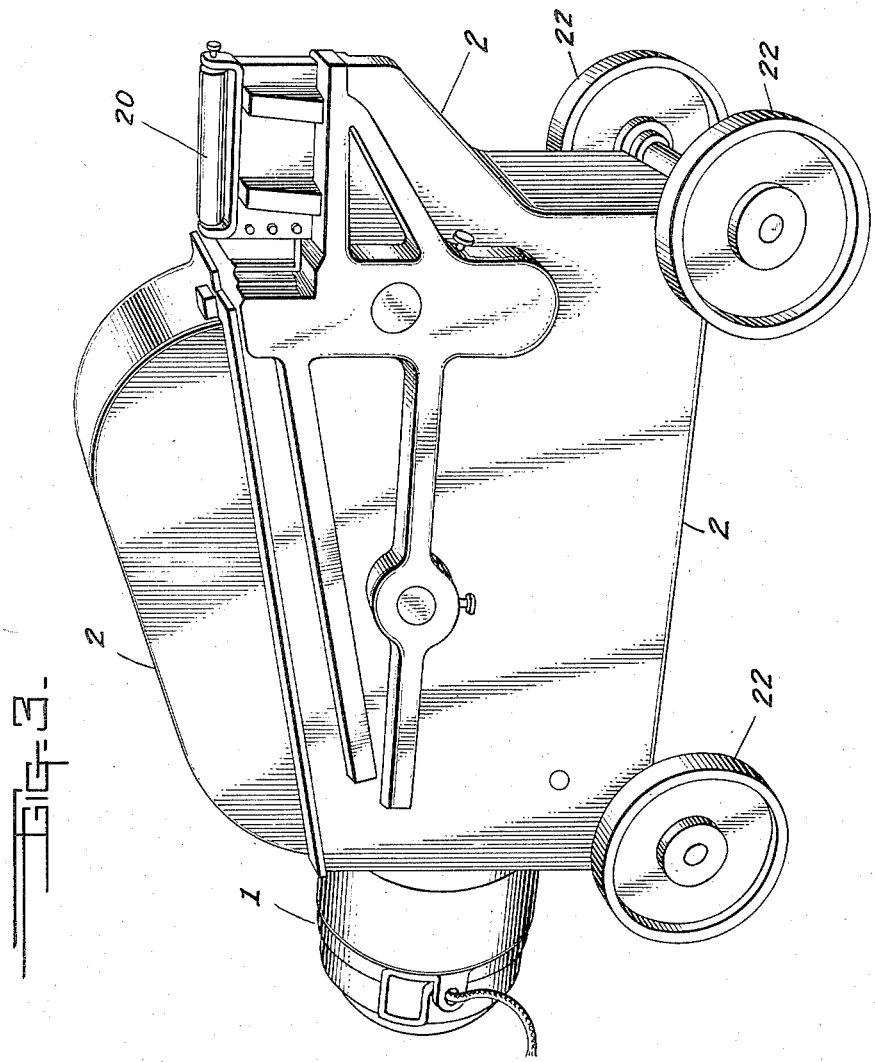

By referring generally to the drawings, part of this application, it will be observed that Fig. 1 is a top view with housing cover removed showing the operating parts of the device; Fig. 2 is a side elevational view with cover removed showing the operating parts; and Fig. 3 is an isometric view of the complete machine.

Similar reference numerals refer to similar parts throughout the several views.

Referring to the drawings in detail is will be seen that the device comprises an electric motor 1 with a comparatively heavy fly wheel 1' mounted in one end of the housing 2. The shaft 3 connected to the motor is adapted to drive the worm 4 that is in mesh with the worm gear 5 mounted on the shaft 6. On the same shaft a pinion gear 7 is mounted and is fixed to the shaft and revolves with and in unison with the worm gear. The gear 7 is in mesh with the large main gear 8 supported on the shaft 9. On this same shaft the special shaped cam 10 is mounted and revolves in unison with the large main gear. The circumference face of the cam serves as a track for the roller 11 on the shaft 12 supported in the end of the blade lever arm 13 that is swingable on its shaft 14. The cutting blade 15 is removably attached by suitable bolts 16 to the blade lever upper portion. The housing portion 17 as a base supports the blade companion member 18. A bracket 19 supports the work roller 20 near the blade to facilitate handling of bars or similar material for cutting. A bar 21 is shown in place for cutting. The assembled machine is carried on wheels 22 to thus provide means for easy movement to various departments of a plant in which it is being used.

From the foregoing it will appear that to use the bar shears a bar or other similar material is placed adjacent the blade with same in the position plainly shown in Fig. 2, then the motor is started (from source of power not shown) causing enormous force to be supplied to move the blade as a result of the progressive power combination starting with the worm operating the worm gear, the worm gear revolving the pinion gear, the pinion gear turning the main large gear that carries the cam adapted to create tremendous lift on the lever that gently forces the knife edge through the bar. Such a progressive chain of power allows for an electric motor of low horse power to be used which is a great advantage in many ways.

The machine may be made of any material and parts suitable for the purpose, but I prefer to use such metals and parts generally used in the construction of such devices. Also the machine may be made in different sizes and shapes and capacities.

While I have shown and described the preferred embodiment of my invention, I do not wish to limit same to the exact and precise details of structure, but reserve the right to make all modifications and changes so long as they remain within the spirit and scope of the following claims.

Having described by invention I claim:

1. In metal bar shears comprising; in combination a main portable housing, an electric motor mounted in one end of the housing, a shaft connected to and leading from the motor, a comparatively heavy fly wheel mounted on said shaft, a worm mounted in fixed contact on the end portion of the shaft, a small housing with a bearing supporting the end of the worm shaft, an intermediate shaft supported in bearings, a worm gear mounted in fixed contact on said second shaft and in mesh with the worm, a pinion gear mounted in fixed contact on said second shaft, a third shaft, a main large gear mounted in fixed contact on said third shaft, said pinion gear being in mesh with said large gear, an elongated cam mounted in fixed contact on the said third shaft adjacent the hub of the said large gear; a comparatively large lever mounted swingably on a fourth shaft supported in bearings, a small roller mounted on a shaft in the end of said lever, said small roller in contact with the circumference face of said cam and adapted to maintain contact therewith when the cam revolves; a metal cutting blade removably attached on the other end portion of the lever and positioned above the shaft supporting the lever, a supporting base integral with the main housing, a companion member for cutting mounted on said base and positioned opposite the cutting blade edge, space adjacent the cutting blade adapted for inserting material therein for cutting by the blade; a revolvable roller mounted on the top of said supporting base and adapted for material to be rolled thereon for placing into position for cutting by the blade.

2. In metal bar cutting shears of the class described according to claim 1, said main housing enclosing the entire movable parts of the device except the cutting blade, integral bearing supports in the housing for the shafts of the main gear and the main shaft of the lever, the top cover portion of the housing adapted for easy removal for inspection and oiling of the mechanism.

AARON SACHS.

REFERENCES CITED

The following references are of record in the file of this patent:

UNITED STATES PATENTS

| Number | Name | Date |
|---|---|---|
| 42,003 | Lamplugh | Mar. 22, 1864 |
| 510,512 | Lee | Dec. 12, 1893 |
| 855,765 | Gerlach | June 4, 1907 |
| 1,650,076 | Laencher | Nov. 22, 1927 |